US006892496B1

(12) United States Patent
Youngs et al.

(10) Patent No.: US 6,892,496 B1
(45) Date of Patent: May 17, 2005

(54) METHOD OF ASSEMBLING A VEHICLE DOOR

(75) Inventors: John D. Youngs, Southgate, MI (US); James Gregory, Harrison Township, MI (US); Richard D. George, Rochester Hills, MI (US); Bogdan Radu, Novi, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/172,792

(22) Filed: Jun. 14, 2002

(51) Int. Cl.[7] .............................................. E06B 3/00
(52) U.S. Cl. .......................................... 49/506; 49/502
(58) Field of Search ........................ 49/506, 502, 372, 49/348; 296/146.7, 146.5

(56) References Cited

U.S. PATENT DOCUMENTS

| 4,923,542 | A | * | 5/1990 | Janicki et al. ................. 156/92 |
| 5,050,350 | A | * | 9/1991 | Bertolini et al. .............. 49/502 |
| 5,090,158 | A | * | 2/1992 | Bertolini ...................... 49/348 |
| 5,308,129 | A | * | 5/1994 | Hlavaty ....................... 292/216 |
| 5,647,171 | A | * | 7/1997 | Wirsing et al. ............... 49/502 |
| 5,904,002 | A |   | 5/1999 | Emerling et al. |
| 6,205,714 | B1 | * | 3/2001 | Staser et al. .................. 49/502 |
| 6,301,835 | B1 | * | 10/2001 | Pfeiffer et al. ................ 49/502 |
| 6,594,955 | B1 | * | 7/2003 | Delire et al. .................. 49/502 |
| 6,615,546 | B2 | * | 9/2003 | Furuyama et al. ............ 49/502 |
| 6,616,216 | B2 | * | 9/2003 | Furuyama et al. ....... 296/146.7 |
| 2002/0095870 | A1 | * | 7/2002 | Praud et al. .................. 49/502 |

FOREIGN PATENT DOCUMENTS

| WO | 03/037667 | 5/2003 |
| WO | 03/037669 | 5/2003 |

* cited by examiner

Primary Examiner—Gregory J. Strimbu
(74) Attorney, Agent, or Firm—Bill C. Panagos

(57) ABSTRACT

A method of attaching a component to a vehicle door includes first providing a carrier. The component, such as a lock-latch assembly or a window regulator assembly, is then attached to the carrier. The carrier is then attached to the vehicle door. Subsequent to attaching the carrier to the vehicle door, the component is attached to and supported by the vehicle door. The component can then be unattached from the carrier. The carrier may then be removed from the vehicle door subsequent to unattaching the component from the carrier, thereby providing access to the component, such as for repair or removal of the component.

18 Claims, 5 Drawing Sheets

METHOD OF ASSEMBLING A VEHICLE DOOR

BACKGROUND OF THE INVENTION

The present invention relates to a vehicle door, and more particularly to an improved method of assembling a vehicle door.

In most land vehicles in use today, a door assembly is provided with various mechanical and electrical vehicle components. Such components can include a window regulator and motor for raising and lowering a window, a lock-latch assembly for latching and unlatching the vehicle door, a door release handle connected to the lock-latch assembly, audio speakers, and switches for controlling power mirrors, power windows, and the like.

One known method of assembling a door assembly includes first attaching the desired vehicle components to a sheet metal surface of the door, and then attaching a decorative door trim panel assembly to the door. A door trim panel in such a door assembly can include an upper trim panel and a lower trim panel, or be of a one-piece design.

Another known method of assembling a door assembly is typically known as a modular method, such as that shown in U.S. Pat. No. 5,904,002 to Emerling et al., which is incorporated by reference herein. In a typical modular method of assembly, desired electrical vehicle components, such as a window regulator and a lock-latch, are first attached to a door panel. The door panel is then attached to the sheet metal frame of the vehicle door. Window glass is then typically attached to the window regulator by aligning attachment points on the window regulator with tool access apertures in the carrier, attaching the window glass to the window regulator, and placing a seal or water-shield over the carrier. Once attached to the door, the door panel becomes part of the door assembly support structure, as loads generated by the mass and motion of the electrical components are supported by the door panel, and only transferred to the door through the fasteners that attach the door panel to the door. One or more door trim panels are then attached to the sheet metal of the door over the door panel, or attached to the door panel.

Undesirable noise and vibration can be generated by the components attached to the door panel, and transmitted to the passenger compartment of a vehicle. Additionally, some components mounted to the door panel can include moving parts. If improperly mounted, or damaged, components having such moving parts can damage the door panel.

The modular method of assembling a door assembly can also increase the time, complexity, and expense of repairing, maintaining, or replacing electrical components within the door assembly. For example, a typical method of performing maintenance or service on a lock-latch assembly or a window regulator assembly in a conventional modular door assembly includes the steps of:

(1) unattaching the door release handle;
(2) unattaching the lock-latch from the door release handle;
(3) removing the trim panel or panels;
(4) positioning the window glass attachment points relative to the tool access apertures,
(5) unattaching the window glass from the window regulator;
(6) removing the window glass, or securing the window glass in the door frame;
(7) removing the fasteners and the wiring harness connector connecting the door trim panel assembly to the lock-latch assembly;
(8) removing the door panel with the window regulator attached; and
(9) maintaining, repairing, or replacing the lock-latch and/or the window regulator.

Accordingly, it would be advantageous to provide an improved method of assembling a vehicle door.

SUMMARY OF THE INVENTION

The invention relates to a method of attaching a component to a vehicle door. Initially, a carrier provided. A component, such as a lock-latch assembly or a window regulator assembly, is then attached to the carrier. The carrier is then attached to the vehicle door. Subsequent to attaching the carrier to the vehicle door, the component is attached to and supported by the vehicle door. The component can then be unattached from the carrier. The carrier may then be removed from the vehicle door subsequent to unattaching the component from the carrier, thereby providing access to the component, such as for repair or removal of the component.

Various objects and advantages of this invention will become apparent to those skilled in the art from the following detailed description of the preferred embodiment, when read in light of the accompanying drawings.

DETAILED DESCRIPTION OF THE INVENTION

Figure 1:
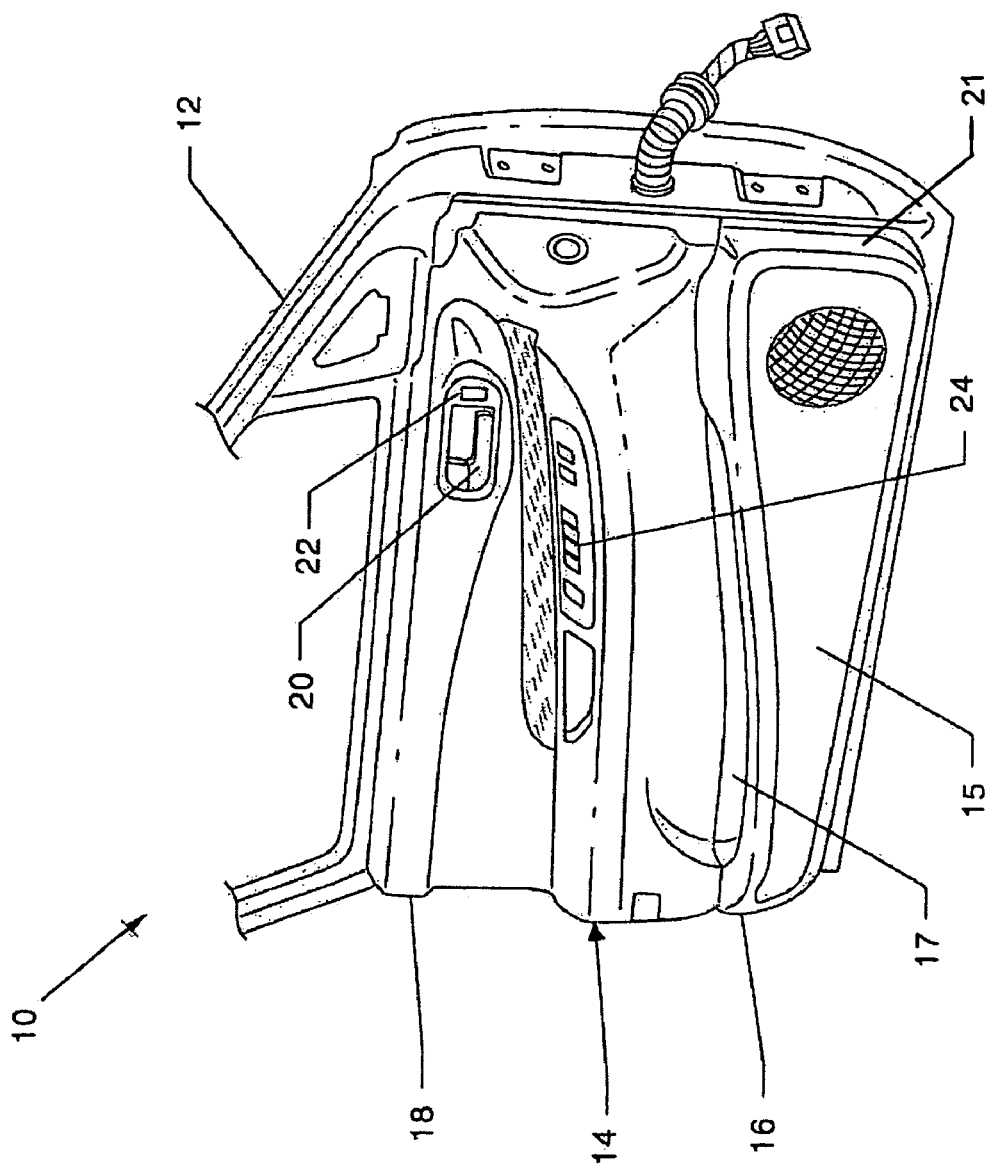
FIG. 1 is a perspective view a vehicle door manufactured according to the method of this invention.

Referring now to the drawings, there is illustrated in FIG. 1 a vehicle door assembly, indicated generally at 10. The door assembly typically includes a sheet metal frame or door body 12 and a trim panel assembly 14 mounted thereto. The trim panel assembly 14 includes a first door trim panel or carrier 16, and a second door trim panel 18, although two trim panels are not required. The second door trim panel 18 generally covers an upper portion of the carrier 16. The door assembly 10 typically includes an inside door release handle 20 for actuating a door lock-latch assembly, as will be described below. The trim panel assembly 14 typically includes switches for controlling various vehicle electrical components. In the illustrated embodiment, a power door lock switch 22, and a power window switch 24 are shown. The trim panel 14 can include attachments or parts integral thereto, such as an armrest. The trim panel assembly 14 can also include switches for any desired vehicle component.

Figure 2:
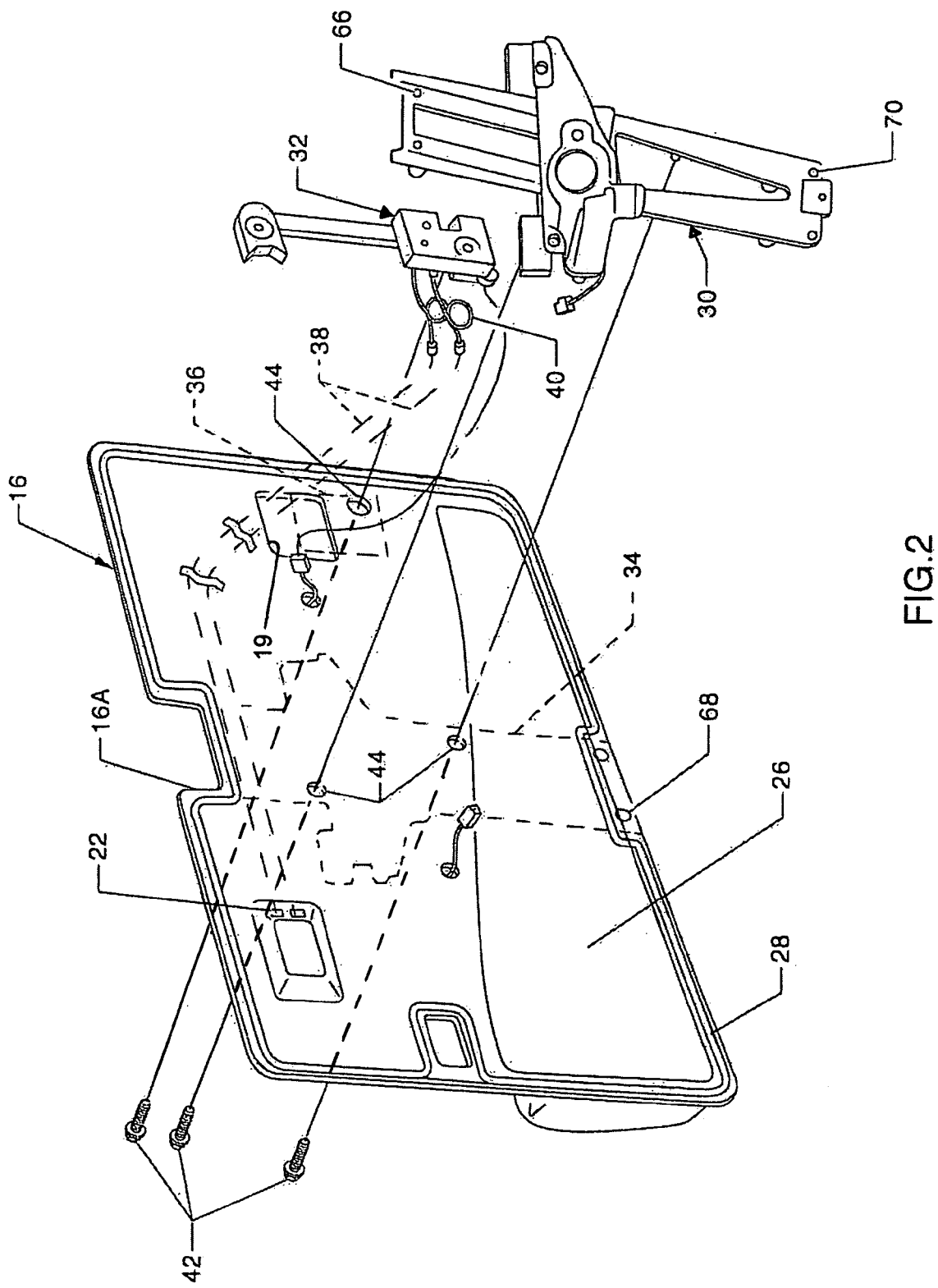
FIG. 2 is an exploded perspective view of the rear surface of a carrier assembled according to the method of this invention, showing a window regulator assembly and a lock-latch assembly.
Figure 3:
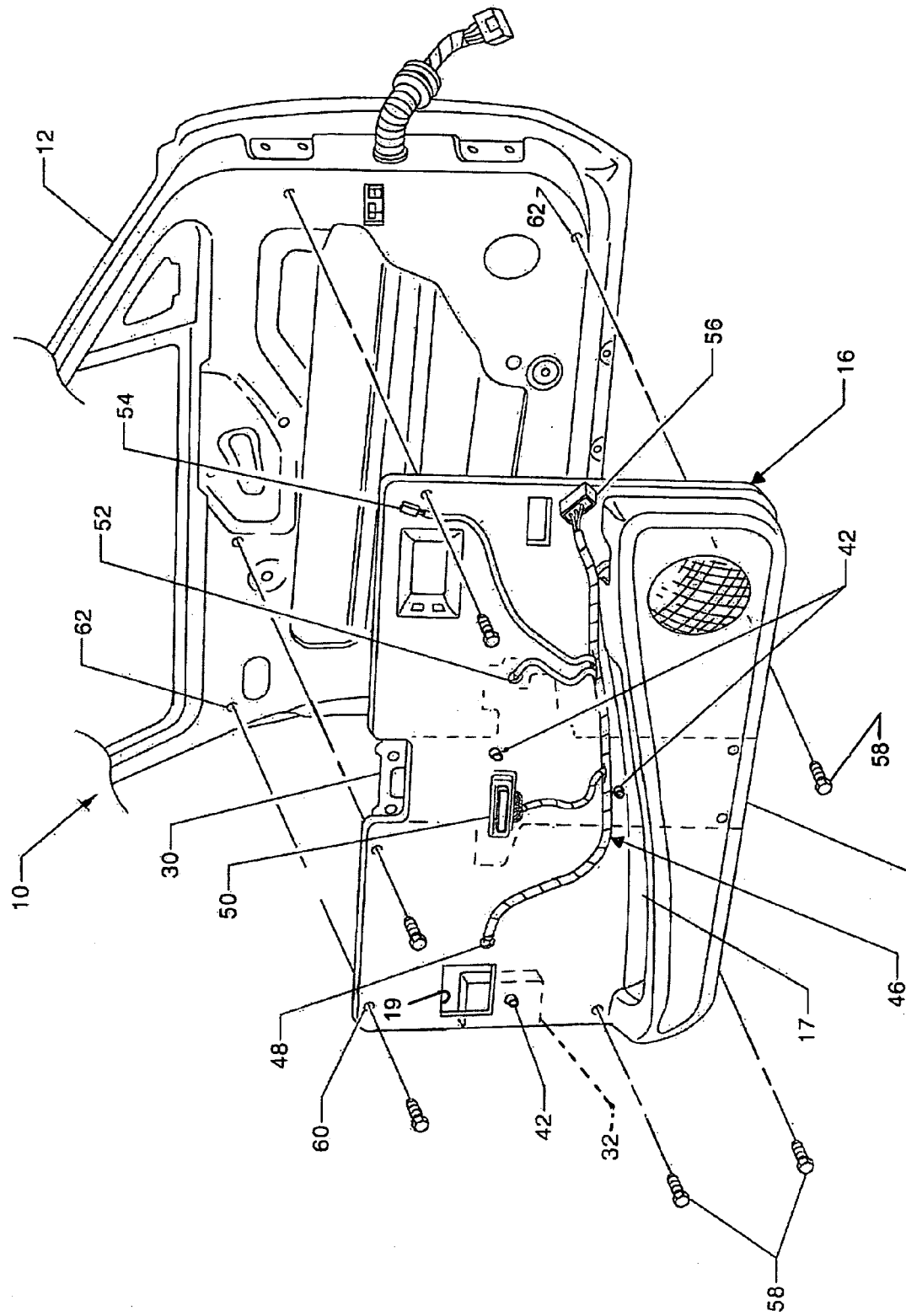
FIG. 3 is an exploded perspective view of the vehicle door illustrated in FIG. 1, showing the carrier and the door body.

Referring now to FIG. 2, there is illustrated the first door trim panel or carrier 16 that is adapted to be used in accordance with the method of this invention. The carrier 16 is includes a rear surface 26, and, as shown in FIGS. 1 and 3, a front surface 15. Typically, the rear surface 26 faces the door body 12 and forms an inside surface of the assembled door assembly 10. The rear surface 26 typically includes a fluid seal 28 mounted along a peripheral edge thereof to protect the interior of the door assembly 10.

The carrier 16 is preferably formed of a molded plastic material such as polypropylene. As appreciated by those skilled in the art, the carrier 16 can be fabricated of other materials, such as wood fibers, polyurethane, solid molded vinyl, expanded polyurethane foam, any combination thereof, or any other suitable rigid material. Preferably, at least a portion of the exterior or front surface 15 of the carrier 16 includes an ornamental or decorative surface texture which is aesthetically pleasing to a vehicle occupant. As shown in FIG. 1, a lower portion 21 of the carrier 16 has a decorative surface. The lower portion 21 of the carrier 16 can include a pocket 17. The pocket 17 can be attached to a flat panel to form the carrier 16. Preferably, the pocket 17 is integrally formed with the carrier 16. Although not illustrated in FIG. 1, it will be appreciated that portions of the front surface 15 of the carrier 16 may be covered with a decorative trim material such as cloth, vinyl, leather, and/or carpeting. The carrier 16 can be attached to the door body 12 by suitable fasteners, as will be described below.

According to a first embodiment of the method of the invention, a component is attached to the carrier 16, and more preferably is attached to the rear surface 26 of the carrier 16. The component can be any vehicle component which is desired to be mounted within the door assembly 10. Two components are shown in the illustrated embodiment, although two components are not required. As shown in FIG. 2, a window regulator assembly 30 and a lock-latch assembly 32 are preferably removably attached to the carrier 16 for subsequent attachment to the door body 12, as will be explained below. Phantom line 34 indicates the mounting location of the window regulator assembly 30, and phantom line 36 indicates the mounting location of the lock-latch assembly 32. Phantom lines 38 indicate the path and mounting location of mechanical or electrical cables 40 for connecting the lock-latch assembly 32 to the release handle 20 and the lock switch 22. Many types and styles of window regulator assemblies and lock-latch assemblies are known in the art. It will be appreciated that any desired type of style of window regulator assembly and lock-latch assembly can be attached to the carrier in accordance with the method of the invention.

The window regulator assembly 30 and the lock-latch assembly 32 can be attached to the rear surface 26 of the carrier 16 by any desired means, such as first fasteners 42. Preferably, the first fasteners 42 are inserted through first apertures 44 and received in suitable corresponding receiving apertures in the window regulator assembly 30 and the lock-latch assembly 32. A push-fit fastener, such as by a Christmas tree type fastener is preferred because of its ability to be easily and quickly inserted and removed. A Christmas tree type fastener is well known in the art, and provides a series of resilient fins capable of different levels of axial retention and grip ability. A Christmas tree type fastener typically includes fins which flex inward during application and retract outward once inserted, thereby creating an axial force which holds respective members, e.g. the carrier 16 and the window regulator assembly 30, together. The fasteners can also be any desired type of fastener, such as threaded fasteners.

The lock-latch assembly 32 can be connected to an inside door release handle 20 by any desired linkage. A mechanical linkage, such as a cable or a rod (not shown) is preferred. Preferably, the mechanical linkage is attached to the rear surface 26 of the carrier 16 by any suitable means, and includes a quick-disconnect at a lock-latch end of the mechanical linkage. The quick-disconnect is preferably positioned to be accessed and operated through an access opening 19 in the carrier 16.

Preferably, as shown in FIG. 3, a wiring harness 46 is provided for connecting the electrical components contained within the door assembly 10 to a source of vehicle power (not shown). The wiring harness 46 carries electrical current to all desired components, and can include any desired number of plug-in type connectors. In the illustrated embodiment, a lock-latch assembly connector 48, a door switch (for controlling the power windows, interior lights, and the like) connector 50, a window regulator motor connector 52, a power mirror connector 54, and a connector 54 for connecting the wiring harness 46 to the source of vehicle power are shown. However, any desired type of electrical connector, and any desired combination of electrical connectors and wiring harnesses can be used. The wiring harness 46 is attached to the front surface 15 of the carrier 16 by any desired means. Preferably, the wiring harness 46 is attached to the carrier 16 by positioning some or all of its length within channels or hooks (not shown) molded into the carrier 16. The connectors can be any desired type of electrical connectors. Preferably, the connectors are self-aligning and/or self-docking connectors, although such connectors are not required.

As shown in FIG. 3, the carrier 16 can be attached to the door body 12 by any desired means, such as second fasteners 58. Preferably, the second fasteners 58 are inserted through second apertures 60 in the carrier 16 and received in suitable corresponding receiving apertures 62 in the door body 12. A push-fit fastener, such as a Christmas tree type fastener is preferred because of its ability to be easily and quickly inserted and removed, as described above.

Figure 4:
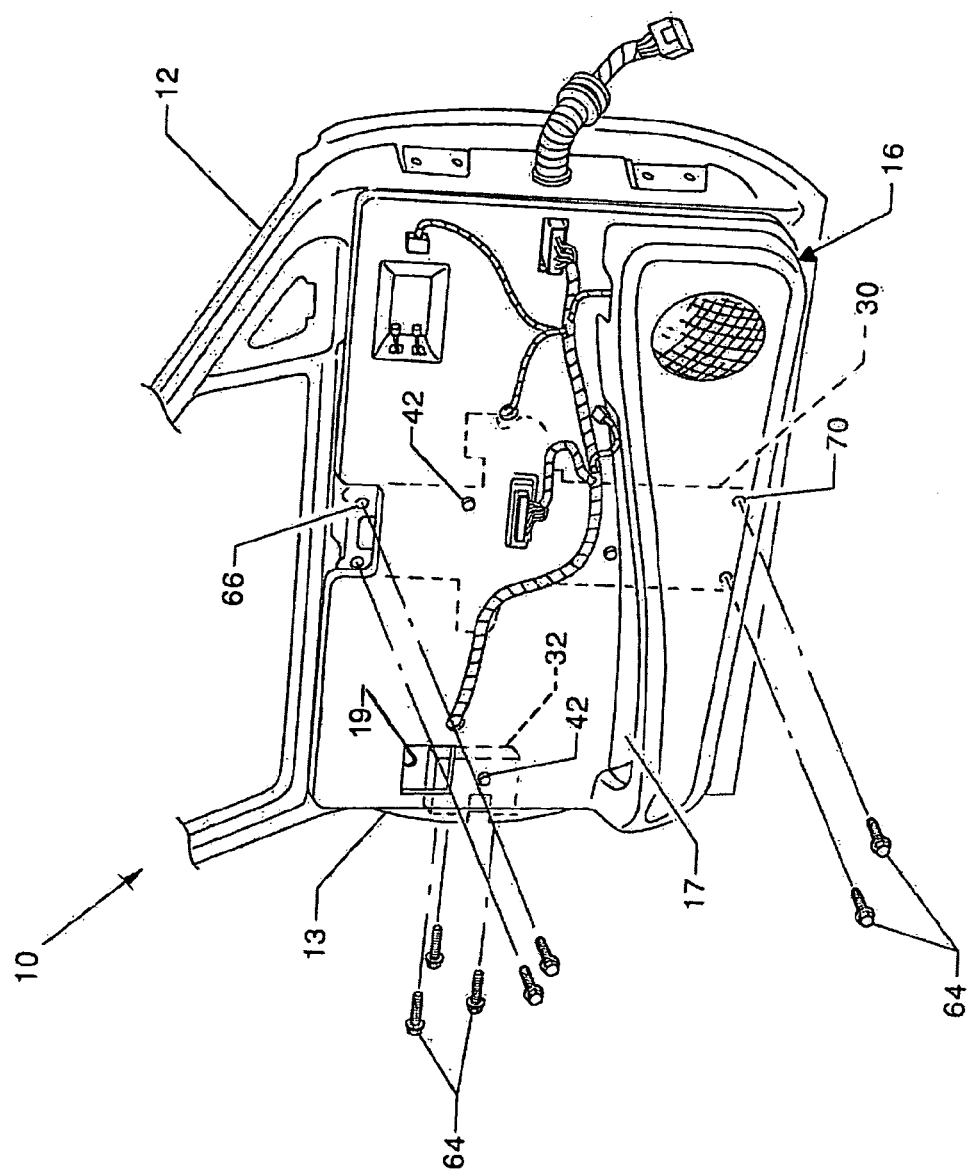
FIG. 4 is a partially exploded perspective view of the vehicle door illustrated in FIGS. 1 and 3, showing fasteners for attaching the window regulator and the lock-latch to the door body.

After the carrier 16 has been attached to the door body 12, the window regulator assembly 30 and the lock-latch assembly 32 can be attached to the door body 12 by any desired means, such as third fasteners 64, as shown in FIG. 4. A threaded fastener is preferred to securely attach the window regulator assembly 30 and the lock-latch assembly 32 to the door body 12. Preferably, a notch 16A, as best shown in FIG. 2, is formed in an upper portion of the carrier 16. The notch 16A exposes and provides access to upper apertures 66 of the window regulator assembly 30. The upper portion of the window regulator assembly 30 can then be attached to the door body 12 by third fasteners 64 extending into the upper apertures 66. Lower apertures 68, as best shown in FIG. 2, can be formed in a lower portion of the carrier 16. Preferably, the apertures 68 are larger than the third fasteners 64, such that the third fasteners 64 can be inserted into apertures 68. The lower portion of the window regulator assembly 30 can then be attached to the door body 12 by third fasteners 64 extending through lower apertures 70 of the window regulator assembly 30. Accordingly, the third fasteners used to attach the lower portion of the window regulator assembly 30 to the door body 12 are preferably not in contact with the carrier 16, and therefore do not attach the carrier 16 to the door body 12. The lock-latch assembly 32 is preferably attached to a side portion 13 of the door body 12.

Preferably, subsequent to attaching the window regulator assembly 30 and the lock-latch assembly 32 to the door body 12, the first fasteners 42 can be removed, thereby unattaching the window regulator assembly 30 and the lock-latch assembly 32 from the carrier 16. Thus, the carrier 16 can function as a locating structure which locates the various components for easy mounting to the door body 2. Alternately, if desired, the first fasteners 42 can remain in an attached position until it is necessary to remove the trim panel assembly 14 from the door body, such as, for example, during service, maintenance, or replacement of electrical components within the door assembly 10.

After the window regulator assembly 30 and the lock-latch assembly 32 have been attached to the door body 12, the second door trim panel 18, as shown in FIG. 1, is preferably attached over and to the upper portion of the carrier 16 by any desired means. Like the carrier 16, the second door trim panel 18 can include ornamental or decorative surfaces. The second door trim panel 18 can also include an integrally formed armrest, the door release handle 20, and controls and switches, such as the power door lock switch 22, and the power window switch 24.

As described above, in a door assembly wherein the components remain attached to a door panel after the door panel is attached to the sheet metal of the door, the door panel, and the fasteners which attach the door panel to the sheet metal of the door, must be substantially robust to support loads generated by the components. However, according to the method of this invention, the electrical components are attached to the door body 12, and loads generated by the electrical components are thereby supported by the door body 12. Thus, the carrier 16 and the fasteners 58 need not be robust so as to solely support the loads of the components. For example, it has been discovered that if electrical components, such as the window regulator assembly 30 and the lock-latch assembly 32, remain attached to the carrier 16, undesirable noise and vibration can be generated and transmitted to the passenger compartment of a vehicle. Therefore, it is preferred that the components are unattached from the carrier 16. Additionally, if improperly mounted or damaged, a component having moving parts, such as the window regulator assembly 30, can damage the carrier 16. It has been further discovered that by attaching the window regulator assembly 30 and the lock-latch assembly 32 to the door body 12, and unattaching them from the carrier 16, undesirable noise and vibration can be substantially reduced.

The method of assembling a door assembly 10 according to this invention provides improved access to the window regulator assembly 30 and the lock-latch assembly 32 during repair or replacement thereof. Additionally, the number of steps required when performing maintenance or service on the window regulator assembly 30 and the lock-latch assembly 32 are substantially reduced. For example, performing maintenance or service on the window regulator assembly 30 and the lock-latch assembly 32 in accordance with the method of this invention generally includes the steps of: (1) removing the fasteners attaching the second door trim panel 18 to the carrier 16; (2) removing the second door trim panel 18; (3) detaching selected wiring harness connectors, such as the power mirror connector 45; (4) disconnecting, through access opening 19, the quick-disconnect which connects the lock-latch assembly 32 to the inside door release handle 20; (5) removing the second fasteners 58; and (6) removing the carrier 16, thereby providing access to the window regulator assembly 30 and the lock-latch assembly 32. The window regulator assembly 30 and the lock-latch assembly 32 can thereby be easily and economically repaired or replaced. Additionally, the window regulator assembly 30 can be repaired without having to remove or detach the window glass from the window regulator assembly 30.

Figure 5:
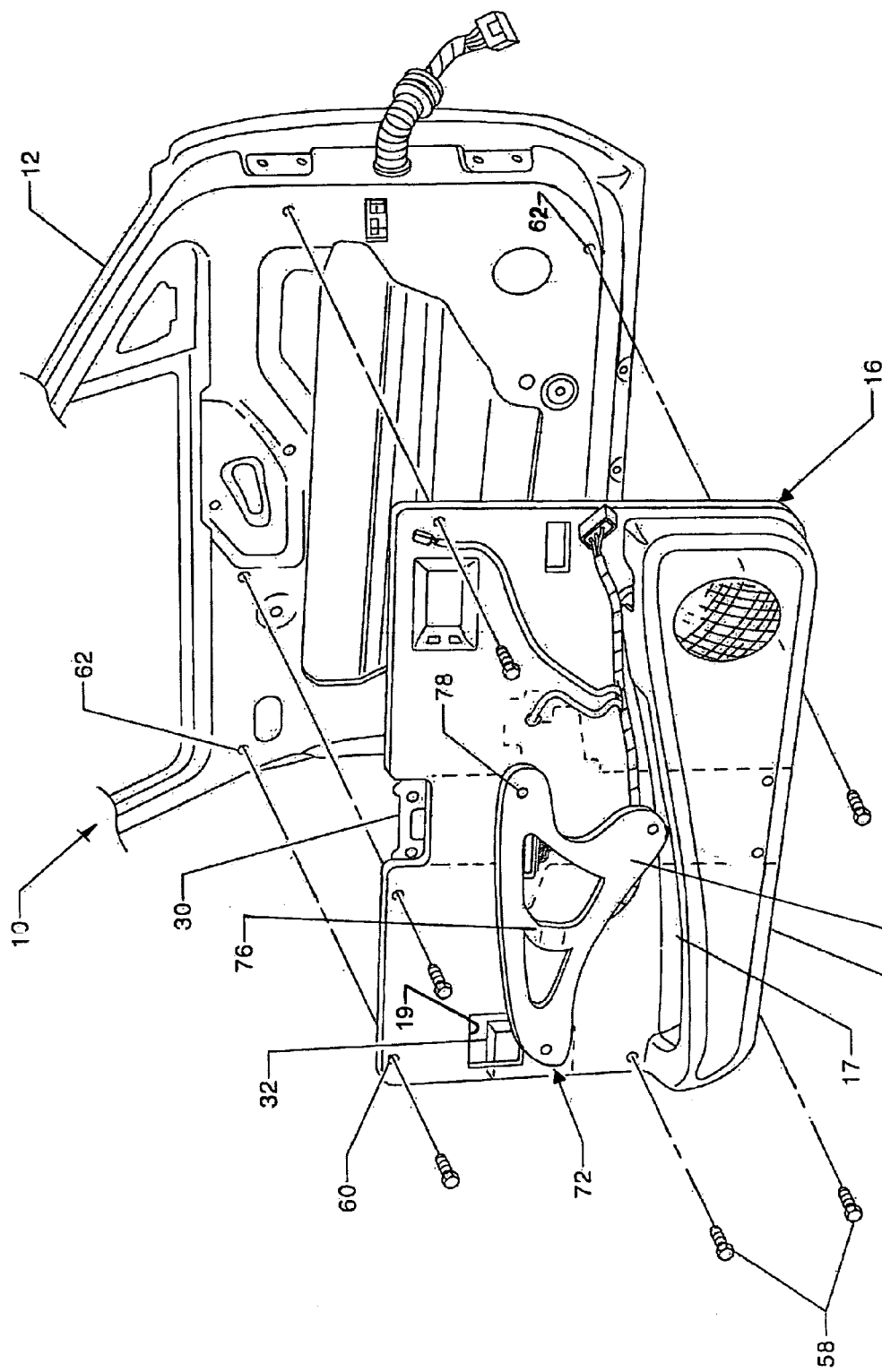
FIG. 5 is an exploded perspective view of a vehicle door according to an alternate embodiment of the method of this invention, showing a fastener assembly attached to the carrier.

An alternate embodiment of the method of the invention is illustrated in FIG. 5, and includes a fastener assembly 72 for attaching the window regulator assembly 30 and the lock-latch assembly 32 to the carrier 16. The fastener assembly 72 includes a body portion 74, a handle 76, and a plurality of fasteners 78. A push-fit fastener, such as a Christmas tree type fastener is preferred because of its ability to be easily and quickly inserted and removed. Preferably the fasteners 78 are integrally formed with the body portion 74.

The quantity and arrangement of the fasteners 78 preferably corresponds with the quantity and arrangement of the apertures 44, as shown in FIG. 2. In accordance with the embodiment of the invention illustrated in FIG. 5, the window regulator assembly 30 and the lock-latch assembly 32 can be quickly and easily attached to the carrier 16 with the fastener assembly 72. Similarly, subsequent to attaching the window regulator assembly 30 and the lock-latch assembly 32 to the door body 12, the fastener assembly 72 can be quickly and easily removed, thereby unattaching the window regulator assembly 30 and the lock-latch assembly 32 from the carrier 16. All other aspects of the method illustrated in FIG. 5 are identical to the method illustrated in FIGS. 2 through 4, and described herein.

In the illustrated embodiment, the fastener assembly 72 is generally A-shaped with generally rounded edges to conform to the locations of the apertures 44, however the fastener assembly 72 can have any desired shape. Preferably, the fastener assembly is shaped to interconnect the fasteners 78.

Although the fasteners 78 illustrated in FIG. 5 are integrally formed with the fastener assembly 72, such is not required. For example, the fastener assembly can include apertures through which fasteners can be inserted for attachment to the window regulator assembly 30 and the lock-latch assembly 32. Fasteners used with such a fastener assembly can be any desired type of fastener. A push-fit fastener, such as a Christmas tree type fastener is preferred because of its ability to be easily and quickly inserted and removed.

The principle and mode of operation of this invention have been described in its preferred embodiments. However, it should be noted that this invention may be practiced otherwise than as specifically illustrated and described without departing from its scope.

What is claimed is:

1. A method of attaching a component to a vehicle door, the method comprising the steps of:
   (a) providing a first carrier;
   (b) second attaching the component to the carrier only with a fastener assembly, such that the component, the carrier, and the fastener assembly are attached together;
   (c) third attaching each of the carrier and the component directly to the vehicle door; and
   (d) fourth removing the fastener assembly from the component and carrier, thereby unattaching the component from the carrier.

2. The method according to claim 1, wherein the component is a vehicle electrical component.

3. The method according to claim 1, wherein the component includes at least one of a vehicle lock-latch assembly and a window regulator assembly.

4. The method according to claim 1, wherein the carrier is formed from a polymer.

5. The method according to claim 1, wherein the carrier is a vehicle door trim panel.

6. The method according to claim 1, wherein the fastener assembly includes a threaded fastener.

7. The method according to claim 1, wherein the fastener assembly includes a push-fit fastener.

8. The method according to claim 1, wherein the fastener assembly includes a body portion and a fastener attached to the body portion.

9. The method according to claim 8, wherein the fastener is a threaded fastener.

10. The method according to claim 8, wherein the fastener is a push-fit fastener.

11. The method according to claim 1, wherein the fastener assembly includes a handle.

12. The method according to claim 1, wherein step (c) includes attaching the component to the vehicle door with a threaded fastener.

13. The method according to claim 1, wherein step (c) includes attaching the component to the vehicle door with a push-fit fastener.

14. The method according to claim 1, further including a step (e), step (e) including removing the carrier from the vehicle door, thereby providing access to the component.

15. The method according to claim 1 further including a step (e) subsequent to step (d), step (e) including attaching a trim component to one of the vehicle door and the carrier.

16. The method according to claim 1, wherein step (b) includes attaching a plurality of components to the carrier, and step (c) includes, attaching the components to the vehicle door, thereby attaching the components separately to the vehicle door.

17. The method of claim 1, wherein in step (c) the carrier is attached to the vehicle door subsequently to the component being attached to the vehicle door.

18. The method of claim 1, wherein in step (c) the carrier is attached to the vehicle door prior to the component being attached to the vehicle door.

* * * * *

UNITED STATES PATENT AND TRADEMARK OFFICE
CERTIFICATE OF CORRECTION

PATENT NO. : 6,892,496 B1
DATED : May 17, 2005
INVENTOR(S) : John D. Youngs et al.

It is certified that error appears in the above-identified patent and that said Letters Patent is hereby corrected as shown below:

Column 6,
Line 54, after "(a)" insert -- first --;
after "providing a" delete "first".

Signed and Sealed this

Ninth Day of August, 2005

JON W. DUDAS
*Director of the United States Patent and Trademark Office*